US009185744B2

(12) United States Patent
Cai et al.

(10) Patent No.: US 9,185,744 B2
(45) Date of Patent: Nov. 10, 2015

(54) UPLINK TRANSMISSIONS FOR TYPE 2 RELAY

(75) Inventors: Zhijun Cai, Euless, TX (US); Chandra S. Bontu, Ottawa (CA); Yi Yu, Irving, TX (US); Mo-Han Fong, Kanata (CA); Sophie Vrzic, Ottawa (CA); James Earl Womack, Bedford, TX (US); Andrew Mark Earnshaw, Ottawa (CA); Yi Song, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 449 days.

(21) Appl. No.: 12/817,080

(22) Filed: Jun. 16, 2010

(65) Prior Publication Data

US 2010/0322143 A1 Dec. 23, 2010

Related U.S. Application Data

(60) Provisional application No. 61/218,911, filed on Jun. 19, 2009.

(51) Int. Cl.
*H04W 88/04* (2009.01)
*H04W 40/22* (2009.01)
*H04L 1/18* (2006.01)
*H04L 1/16* (2006.01)

(52) U.S. Cl.
CPC .................. *H04W 88/04* (2013.01); *H04L 1/16* (2013.01); *H04L 1/1816* (2013.01); *H04L 1/1819* (2013.01); *H04L 1/1887* (2013.01); *H04W 40/22* (2013.01)

(58) Field of Classification Search
None
See application file for complete search history.

(56) References Cited

U.S. PATENT DOCUMENTS

| 4,882,765 | A | 11/1989 | Maxwell et al. |
| 5,133,080 | A | 7/1992 | Borras |
| 5,621,732 | A | 4/1997 | Osawa |
| 5,898,679 | A | 4/1999 | Brederveld et al. |
| 6,188,719 | B1 | 2/2001 | Collomby |
| 7,143,282 | B2 * | 11/2006 | Takagi et al. ................. 713/153 |
| 7,577,399 | B2 | 8/2009 | Eichinger et al. |
| 7,890,049 | B2 | 2/2011 | Chang et al. |
| 7,969,940 | B2 | 6/2011 | Kim et al. |
| 7,975,199 | B2 * | 7/2011 | Chindapol et al. ............ 714/751 |
| 7,995,512 | B2 | 8/2011 | Kim et al. |
| 8,014,336 | B2 | 9/2011 | Bertinelli et al. |

(Continued)

FOREIGN PATENT DOCUMENTS

| CN | 1823489 A | 8/2006 |
| CN | 101179320 A | 5/2008 |

(Continued)

OTHER PUBLICATIONS

Can, Basak, et al.; Title: Efficient Cooperative Diversity Schemes and Radio Resource Allocation for IEEE 802.16j; IEEE, Mar. 31, 2008; pp. 36-41.

(Continued)

*Primary Examiner* — Ashley Shivers
(74) *Attorney, Agent, or Firm* — Conley Rose, P.C.; J. Robert Brown, Jr.; Jonathan K. Polk

(57) ABSTRACT

A method for providing user agent data. The method includes an access node receiving an indicator sent from a relay node as an indication that the relay node has received data from the user agent.

14 Claims, 3 Drawing Sheets

(56) References Cited

U.S. PATENT DOCUMENTS

| | | | |
|---|---|---|---|
| 8,244,266 | B2 | 8/2012 | Song et al. |
| 8,351,334 | B2* | 1/2013 | Larsson et al. ............... 370/236 |
| 2006/0233200 | A1* | 10/2006 | Fifield et al. ................. 370/473 |
| 2007/0070954 | A1 | 3/2007 | Kim et al. |
| 2007/0087691 | A1 | 4/2007 | Lee et al. |
| 2008/0108304 | A1* | 5/2008 | Suga ................................. 455/7 |
| 2008/0247354 | A1* | 10/2008 | Hsieh et al. ................... 370/328 |
| 2009/0003260 | A1 | 1/2009 | Guo et al. |
| 2009/0122747 | A1 | 5/2009 | In et al. |
| 2009/0175214 | A1* | 7/2009 | Sfar et al. ..................... 370/315 |
| 2009/0190536 | A1* | 7/2009 | Zhang et al. .................. 370/329 |
| 2009/0217119 | A1* | 8/2009 | Zhang et al. .................. 714/748 |
| 2009/0253429 | A1 | 10/2009 | Lee et al. |
| 2010/0022184 | A1* | 1/2010 | Khoshnevis et al. ............ 455/7 |
| 2010/0097976 | A1* | 4/2010 | Agrawal et al. .............. 370/315 |
| 2010/0232345 | A1* | 9/2010 | Tsai et al. ..................... 370/315 |
| 2011/0019605 | A1* | 1/2011 | Ma et al. ....................... 370/312 |

FOREIGN PATENT DOCUMENTS

| | | |
|---|---|---|
| CN | 101461168 A | 6/2009 |
| EP | 0851632 A2 | 12/1997 |
| EP | 1890444 A2 | 7/2007 |
| EP | 1921800 A2 | 10/2007 |
| EP | 1926233 A1 | 11/2007 |
| EP | 1921800 A2 | 5/2008 |
| EP | 1926233 A1 | 5/2008 |
| WO | 2005008947 A1 | 1/2005 |
| WO | 2008024158 A1 | 2/2008 |
| WO | 2010006113 A1 | 1/2010 |

OTHER PUBLICATIONS

Ryu, Hyun S., et al.; Title: Selective Cooperative Relaying in OFDMA-TDD System for Broadband Mobile Wireless Services; IEEE; May 11, 2008; pp. 2311-2315.

PCT Invitation to Pay Additional Fees (Partial Search Report); PCT Application No. PCT/US2010/038869; Oct. 14, 2010; 8 pgs.

PCT International Preliminary Report on Patentability; PCT Application No. PCT/US2010/038871; Jul. 15, 2011; 14 pgs.

3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.

3GPP TS 36.212 v8.6.0; 3rd Generation Partnership Project; Technical Specification Group Radio Access Network; Evolved Universal Terrestrial Radio Access (E-UTRA); Multiplexing and Channel Coding; Release 8; Mar. 2009; 59 pgs.

3GPP TS 36.304 v8.5.0; 3rd Generation Partnership Project; Technical Specification Group Radio Access Network; Evolved Universal Terrestrial Radio Access (E-UTRA); User Equipment (UE) Procedures in Idle Mode; Release 8; Mar. 2009; 30 pgs.

3GPP TS 36.321 v8.5.0; 3rd Generation Partnership Project; Technical Specification Group Radio Access Network; Evolved Universal Terrestrial Radio Access (E-UTRA); Medium Access Control (MAC) Protocol Specification; Release 8; Mar. 2009; 46 pgs.

3GPP TS 36.331 v8.5.0; 3rd Generation Partnership Project; Technical Specification Group Radio Access Network; Evolved Universal Terrestrial Radio Access (E-UTRA) Radio Resource Control (RRC); Protocol Specification; Release 8; Mar. 2009; 204 pgs.

Ericsson; TSG-RAN WG1 #53; Title: "A Discussion on Some Technology Components for LTE-Advanced;" R1-082024; Kansas City, MO, USA; May 5-9, 2008; 11 pgs.

Samsung; 3GPP TSG RAN WG1 Meeting #53bis; Title: "Application of Network Coding in LTE-Advanced Relay;" R1-082327; Warsaw, Poland; Jun. 30-Jul. 4, 2008; 4 pgs.

China Mobile, Vodafone, Huawei; TSG-RAN WG1 #54; Title: "Application Scenarios for LTE-Advanced Relay;" R1-082975; Jeju, Korea; Aug. 18-22, 2008; 7 pgs.

Qualcomm Europe; 3GPP TSG-RAN WG1 #54; Title: "Operation of Relays in LTE-A;" R1-083191; Jeju, S. Korea; Aug. 18-22, 2008; 5 pgs.

Motorola; TSG-RAN WG1 #54; Title: "Classification of Relays;" R1-083223; Jeju, South Korea; Aug. 18-22, 2008; 3 pgs.

Vodafone, CMCC, CHTTL, Alcatel-Lucent, Alcatel-Lucent Shanghai, Bells, CATT, HTC, ITRI, ZTE; 3GPP TSG RAN WG1 #56bis; Title: "Use Cases of Type II Relay;" R1-091624; Seoul, South Korea; Mar. 23-27, 2009; 5 pgs.

Qualcomm Europe; 3GPP TSG-RAN WG1 #57; Title: "Challenges with Type II Relay Operation;" R1-092058; San Francisco, USA; May 4-8, 2009; 3 pgs.

Pabst, Ralf et al.; Title: Relay-Based Deployment Concepts for Wireless and Mobile Broadband Radio; IEEE Communications Magazine; Sep. 2004; pp. 80-89.

Cai, Zhijun, et al.; U.S. Appl. No. 12/817,077; Title "Downlink Transmissions for Type 2 Relay", filed Jun. 16, 2010.

PCT International Preliminary Report on Patentability; PCT Application No. PCT/US2010/038869; Oct. 10, 2011; 34 pgs.

Ryu, Hyun S., et al,; Title: Selective Cooperative Relaying in OFDMA-TDD System for Broadband Mobile Wireless Services; Vehicular Technology Conference; IEEE; May 11, 2008; pp. 2311-2315.

Can, Basak, et al.; Title: Efficient Cooperative Diversity Schemes and Radio Resource Allocation for IEEE 802.16j; IEEE Wireless Communications and Networking Conference; Mar. 31, 2008; pp. 36-41.

Esseling, Norbert; Title: Extending the Range of HiperLAN/2 Cells in Infrastructure Mode Using Forwarding Mobile Terminals; European Personal Mobile Communication Conference; Feb. 28, 2001; 7 pgs.

PCT International Search Report; PCT Application No. PCT/US2010/038869; Feb. 3, 2011; 7 pgs.

PCT Written Opinion of the International Searching Authority; PCT Application No. PCT/US2010/038869; Feb. 3, 2011; 11 pgs.

PCT International Search Report; PCT Application No. PCT/US2010/038871; Jan. 28, 2011; 4 pgs.

PCT Written Opinion of the International Searching Authority; PCT Application No. PCT/US2010/038871; Jan. 28, 2011; 6 pgs.

Office Action dated Oct. 1, 2012; U.S. Appl. No. 12/817,077, filed Jun. 16, 2010; 25 pages.

Notice of Allowance dated May 1, 2013; U.S. Appl. No. 12/817,077, filed Jun. 16, 2010; 14 pages.

Office Action dated Jan. 17, 2013; U.S. Appl. No. 12/817,077, filed Jun. 16, 2010; 14 pages.

European Examination Report; Application No. 10729982.8; Feb. 21, 2013; 3 pages.

Canadian Office Action; Application No. 2,765,663; Jul. 30, 2013; 2 pages.

Canadian Office Action; Application No. 2,765,512; Dec. 17, 2013; 3 pages.

Canadian Office Action; Application No. 2,765,663; Aug. 1, 2014; 5 pages.

Chinese Office Action; Application No. 201080027231.1; May 30, 2014; 25 pages.

Xu, Jing, et al.; "Differential Distributed Space-Frequency Coding for Broadband Non-Regerative Wireless Relaying Systems"; IEEE; 2008; 6 pages.

Chinese Office Action as Received in Co-pending Application No. 201080036583.3 on Sep. 3, 2014; 6 pages.

Chinese Office Action; Application No. 201080027231.1; Feb. 16, 2015; 23 pages.

European Examination Report; Application No. 10732540.9; Jun. 26, 2015; 6 pages.

* cited by examiner

UPLINK TRANSMISSIONS FOR TYPE 2 RELAY

CROSS-REFERENCE TO RELATED APPLICATIONS

The present application claims priority to U.S. provisional patent application No. 61/218,911 filed Jun. 19, 2009, by Zhijun Cai, et al, entitled "Uplink Transmissions for Type 2 Relay" (35783-1-US-PRV-4214-19100), which is incorporated by reference herein as if reproduced in its entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long Term Evolution (LTE) and LTE-Advanced (LTE-A). For example, an LTE or LTE-A system might include an Evolved Universal Terrestrial Radio Access Network (E-UTRAN) or evolved node B (eNB), a wireless access point, or a similar component rather than a traditional base station. As used herein, the term "access node" will refer to any component of the wireless network, such as a traditional base station, a wireless access point, or an LTE or LTE-A eNB, that creates a geographical area of reception and transmission coverage allowing a UA or a relay node to access other components in a telecommunications system. An access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may be used serially to extend or enhance coverage created by an access node.

These systems can include protocols such as a Radio Resource Control (RRC) protocol, which is responsible for the assignment, configuration, and release of radio resources between a UA and a network node or other equipment. The RRC protocol is described in detail in the Third Generation Partnership Project (3GPP) Technical Specification (TS) 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
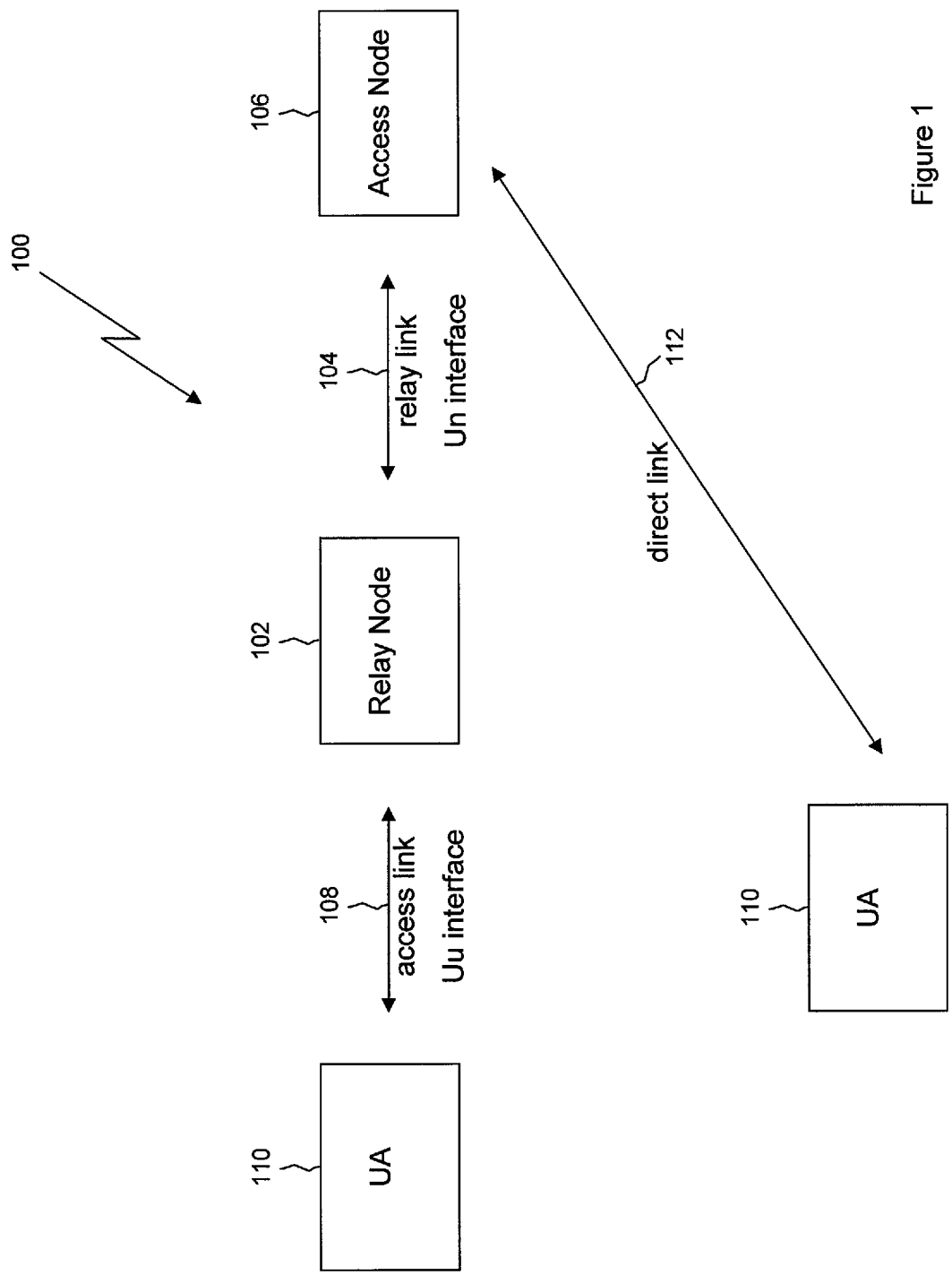
FIG. 1 is a diagram illustrating a wireless communication system that includes a relay node, according to an embodiment of the disclosure.

FIG. 1 is a diagram illustrating a wireless communication system 100 that includes a relay node 102, according to an embodiment of the disclosure. Examples of the wireless communication system 100 include LTE or LTE-A networks, and all of the disclosed and claimed embodiments could be implemented in an LTE-A network. The relay node 102 can receive and amplify a signal received from a UA 110 and transmit the signal to an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110.

The relay node 102 might be placed near the edges of a cell so that the UA 110 can communicate with the relay node 102 rather than communicating directly with the access node 106 for that cell. In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within a cell or to extend the size of coverage of a cell. Additionally, the use of a relay node 102 can enhance throughput of a signal within a cell because the UA 110 can access the relay node 102 at a higher data rate than the UA 110 might get when communicating directly with the access node 106 for that cell, thus creating higher spectral efficiency. The use of a relay node 102 can also decrease the UA's battery usage by allowing the UA 110 to transmit at a lower power.

Relay nodes can be divided into three kinds: layer one relay nodes, layer two relay nodes, and layer three relay nodes. A layer one relay node is essentially a repeater that can retransmit a transmission without any modification other than amplification and slight delay. A layer two relay node can demodulate/decode a transmission that it receives, re-encode/modulate the demodulated/decoded data, and then transmit the re-encoded/modulated data. A layer three relay node can have full radio resource control capabilities and can thus function similarly to an access node. The illustrative embodiments herein are primarily concerned with layer two and layer three relay nodes.

The radio resource control protocols used by a relay node may be the same as those used by an access node, and the relay node may have a unique cell identity typically used by an access node. Relay nodes known as Type 1 relay nodes have their own physical cell IDs and transmit their own synchronization signals and reference symbols. Relay nodes known as Type 2 relay nodes do not have separate cell IDs and thus would not create any new cells. That is, a Type 2 relay node does not transmit a physical ID that is different from the eNB ID. A type 2 relay node should be able to relay to and from legacy (LTE Release 8) UAs and legacy UAs should not be aware of the presence of a Type 2 relay node. In some cases, the embodiments described herein may preferably be implemented in Type 2 relay nodes.

When the UA 110 is communicating with the access node 106 via the relay node 102, the links that allow wireless communication can be said to be of three distinct types. The communication link between the UA 110 and the relay node 102 is said to occur over an access link 108, which can also be referred to as the Uu interface. The communication between the relay node 102 and the access node 106 is said to occur over a relay link 104, which can also be referred to as the Un interface. Communication that passes directly between the UA 110 and the access node 106 without passing through the relay node 102 is said to occur over a direct link 112.

When the UA 110 has data to transmit to the access node 106, the access node can grant the UA 110 a resource that the UA 110 can use for the uplink transmission. When the relay node 102 is present, the relay node 102 can detect the uplink grant information transmitted by the access node 106 and therefore can be aware of when and how the UA 110 will transmit on the uplink. Alternatively, the access node 106 might explicitly signal the uplink grant information to the relay node 102.

When the UA 110 transmits the data on the uplink, the data might be successfully decoded by the relay node 102, by the access node 106, by both the relay node 102 and the access node 106, or by neither the relay node 102 nor the access node 106. If the data is not successfully decoded, the UA 110 may need to retransmit the data. Since retransmissions can consume the UA's battery power, it may be desirable to reduce the number of times that the UA 110 attempts to retransmit the data.

In various embodiments, transmissions made by the relay node 102 can reduce the likelihood that the UA 110 will need to retransmit. In one embodiment, the relay node 102 might send one or more copies of the UA's data to the access node 106. If the access node 106 receives more than one copy of the UA's data, the likelihood that the access node 106 will be able to decode the UA's data is increased, and the likelihood that the UA 110 will need to retransmit its data is decreased. In another embodiment, the relay node 102 sends an indicator to the access node 106 indicating that the relay node 102 has successfully received the UA's data. If the access node 106 receives the indicator but does not successfully receive the UA's data directly from the UA, the access node 106 requests a retransmission of the UA's data from the relay node 102. The relay node 102, rather than from the UA 110, then retransmits the data to the access node 106.

In the first of these two embodiments, if the relay node 102 successfully receives the UA's data, the relay node 102 might send the UA's data to the access node 106 unless the access node 106 first transmits an acknowledgement (ACK) message indicating that the access node 106 has successfully received the UA's data. That is, if the relay node 102 detects that the access node 106 has sent an ACK, the relay node 102 may conclude that the access node 106 may have successfully received the UA's data, and the relay node 102 does not send the UA's data to the access node 106, unless otherwise requested to do so by the access node 106. This separate retransmission request to the relay node 102 may be sent privately over the relay link 104 and may therefore not be visible to the UA 110. If the relay node 102 does not detect an ACK from the access node 106 or does detect a negative acknowledgement (NACK) message from the access node 106, the relay node 102 sends the UA's data to the access node 106.

It should be noted that, in LTE, an ACK in response to an uplink transmission from a UA may not necessarily mean that the receiving entity was able to successfully decode the data. Instead, the ACK may mean that the transmitting entity should not perform an immediate retransmission of the data. However, a later retransmission of the data may be requested in the future. The data should therefore not be deleted by the transmitting entity.

The access node 106 typically sends an ACK/NACK approximately four milliseconds after data from the UA 110 is scheduled to be received. The relay node 102 may not be able to send the UA's data to the access node 106 within this short time before the access node 106 sends the ACK/NACK. Therefore, the relay node 102 might send at least one copy of the UA's data to the access node 106 regardless of whether the access node 106 later sends an ACK or a NACK. If the access node 106 sends an ACK after the relay node 102 has sent the UA's data, the relay node 102 does not send the UA's data again, unless otherwise requested to do so by the access node 106. If the access node 106 sends a NACK after the relay node 102 has sent the UA's data, the relay node 102 continues to send copies of the UA's data to the access node 106 until the relay node 102 detects an ACK from the access node 106.

The access node 106 is likely to be able to receive the copy of the UA's data sent by the relay node 102. The access node 106 might also receive the initial data transmission sent by the UA 110. In addition, if the access node 106 sends a NACK before receiving the copy of the UA's data from the relay node 102, the UA 110 might retransmit its data, and the access node 106 might receive this retransmitted data. In this case, since the relay node can also detect the NACK transmitted by the access node 106, the relay node 102 also simultaneously transmits the same copy of the UA's data to the access node 106 synchronously with the UA's retransmission. If the transmission from the relay node and the UA 110 use the same transmission parameters such as the transmission resource, modulation and coding scheme, etc., the transmission can be combined over the air, which can significantly improve the SINR (signal to interference plus noise ratio) performance. In any case, the access node 106 is likely to receive at least one copy of the UA's data and may receive three or more independently transmitted copies. It is therefore likely that the access node 106 will be able to successfully decode the UA's data after receiving, at most, one retransmission from the UA 110. Even if the access node 106 is not able to decode the UA's data after receiving a retransmission from the UA 110, further retransmissions can be made by the relay node 102 rather than by the UA 110 or by both the relay node 102 and the UA 110. Therefore, the UA 110 may not need to retransmit more than once, thus possibly decreasing the UA's battery usage.

If neither the relay node 102 nor the access node 106 receives the UA's data, the access node 106 sends a NACK in its usual manner, the UA 110 retransmits its data, and the above procedures can be followed again as if the retransmission is an initial transmission.

In other words, a Type-II relay node transmits the received data or the received Transport Block (TB) from the UA 110 to the access node 106 when no ACK is detected from the access node 106 for the received data or the received TB. A Type-II relay node does not transmit the received data or the received TB from the UA 110 to the access node 106 when an ACK is detected from the access node 106 for the received data or the received TB. A Type-II relay node can use the same modulation and coding scheme and other transmission parameters to transmit the received data or the received TB to the access node 106 as were used for the data or the TB received from the UA 110.

In the second of the two embodiments mentioned above, if the relay node 102 receives the UA's data, the relay node 102 sends an indicator over the relay link 104 to the access node 106 indicating that the relay node 102 has successfully received the UA's data. Sending the indicator can be faster and can consume fewer resources than sending the data itself. Upon receiving the indicator, the access node 106 sends an ACK to the UA 110. From the perspective of the UA 110, this ACK indicates that the access node 106 received the UA's data. Therefore, the UA 110 does not need to retransmit its data, even if the access node 106 did not receive the UA's data.

If the access node 106 does receive the UA's data, the access node 106 sends an ACK in its usual manner and can ignore the indicator from the relay node 102. The access node 106 also instructs the relay node 102 to discard the copy of the UA's data that the relay node 102 received from the UA 110. Alternatively, if the relay node 102 detects the ACK from the access node 106, the relay node 102 might discard the copy of the UA's data. However, this alternative may not be desirable since an uplink ACK does not necessarily mean that the receiving entity was able to successfully decode the transmitted data. If the access node 106 does not receive the UA's data, the access node 106 instructs the relay node 102 to transmit the copy of the UA's data that the relay node 102 received from the UA 110. Since any retransmissions of the UA's data are performed by the relay node 102, the UA 110 does not need to retransmit its data, which can possibly improve the UA's battery life.

If neither the relay node 102 nor the access node 106 receives the UA's data, the relay node 102 sends a NACK to the access node 106. The NACK can be implicit or explicit. In the case of an implicit NACK, the relay node 102 does not send an indicator to the access node 106. If the access node 106 wishes to schedule a non-adaptive retransmission (i.e., a retransmission occurring with a pre-determined time or subframe using the same transmission resources as the previous transmission), the access node 106 sends a NACK to the UA 110. If the access node 106 wishes to schedule an adaptive (i.e., dynamically scheduled) retransmission at a later time, the access node 106 sends an ACK to the UA 110.

In one embodiment, the access node 106 may always signal an ACK in response to an uplink transmission from a UA 110, regardless of whether or not the access node 106 was able to successfully decode the data. The access node 106 can then determine if the relay node 102 was able to successfully receive the data. If neither the access node 106 nor the relay node 102 successfully received the data, then the UA 110 is instructed to perform an adaptive retransmission of the data. If the relay node 102 successfully received the data but the access node 106 did not successfully receive the data, then the relay node 102 sends the data over the relay link 104 to the access node 106, and no retransmissions by UA 110 will be required.

In other words, a Type-II relay node transmits an indication to the access node 106 notifying the access node 106 that the Type-II relay node has received the data or the TB successfully from the UA 110. In this case, the access node 106 transmits an ACK to the UA 110 regardless of whether the access node 106 has received the data or the TB correctly or not. If the access node 106 has not received the data or the TB correctly, the access node 106 notifies the Type-II relay node to transmit the received data or the received TB to the access node 106. The Type-II relay node transmits or retransmits the received data or the received TB to the access node 106 until an ACK is received from the access node 106.

Figure 2:
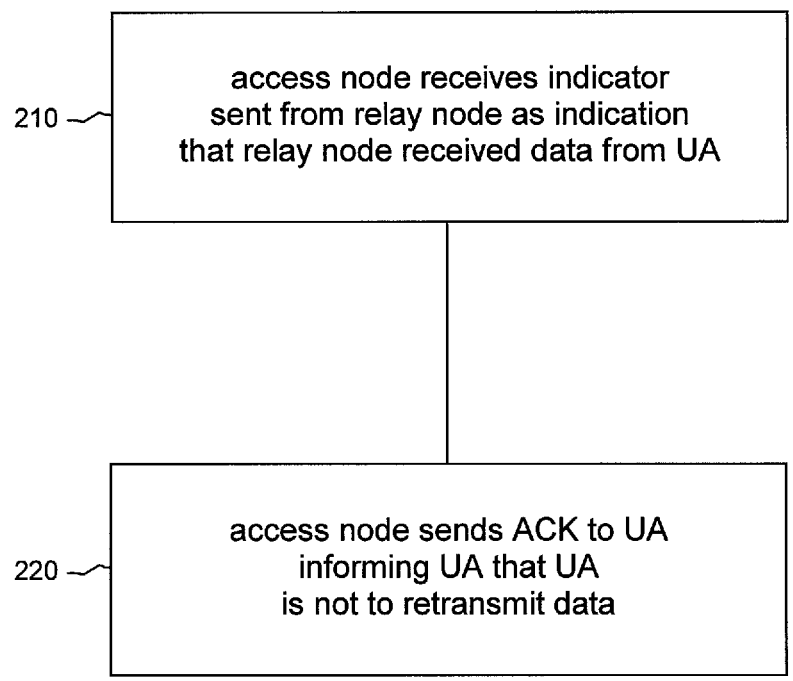
FIG. 2 is a block diagram of a method for decreasing the likelihood that a UA will need to retransmit data according to an embodiment of the disclosure.

FIG. 2 illustrates an embodiment of a method for decreasing the likelihood that a UA will need to retransmit data. In block 210, an access node receives an indicator sent from a relay node as an indication that the relay node has received data from the UA. In block 220, the access node sends an ACK to the UA, informing the UA that the UA is not to retransmit the data.

Figure 3:
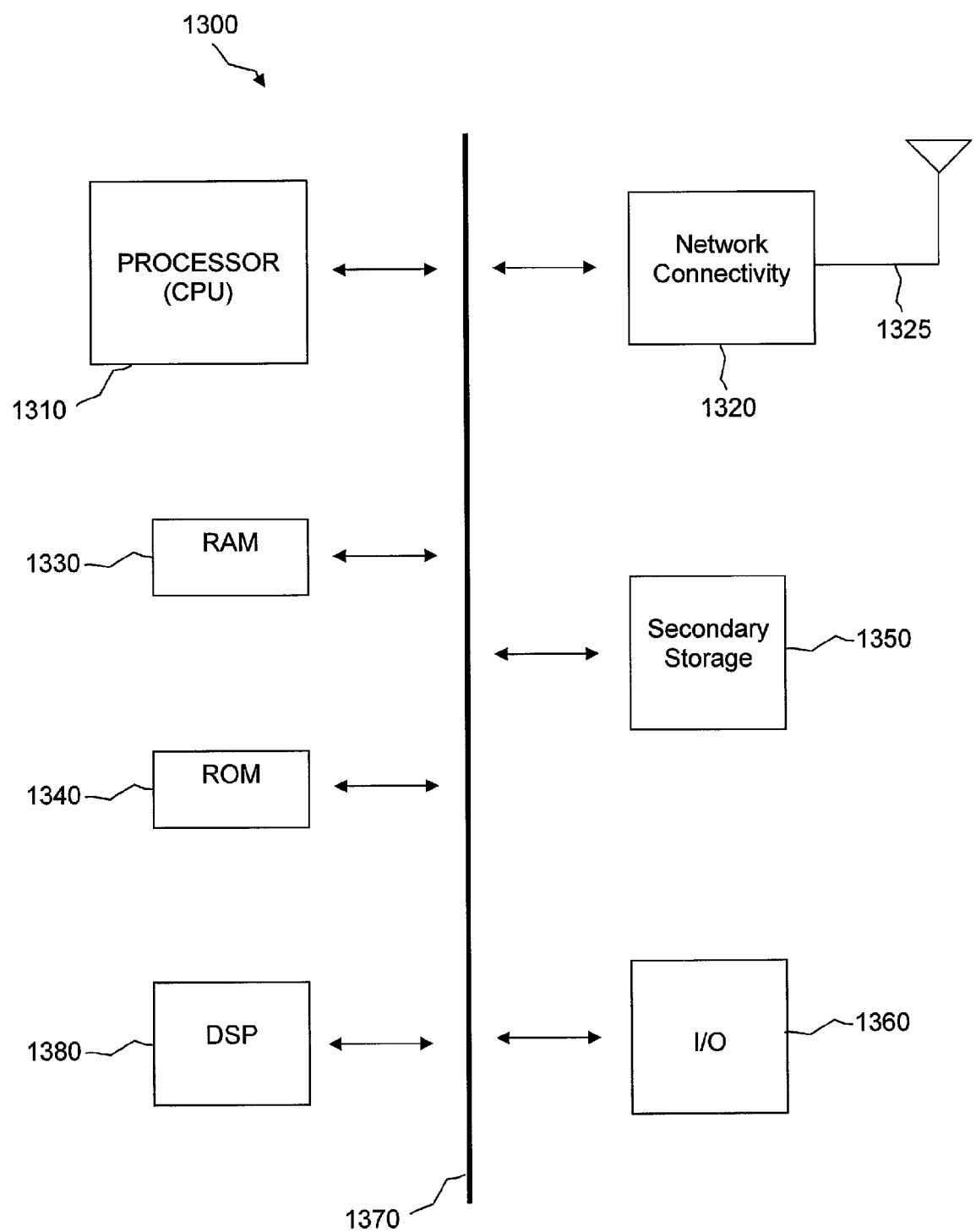
FIG. 3 illustrates a processor and related components suitable for implementing the several embodiments of the present disclosure.

The UA 110, the relay node 102, the access node 106, and other components described above might include a processing component that is capable of executing instructions related to the actions described above. FIG. 3 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method is provided for providing UA data. The method includes, when a relay node receives data from the UA, and when the relay node has not received an ACK message from an access node indicating that the access node has received the data, the relay node sending the data to the access node.

In another embodiment, a relay node in a wireless telecommunications system is provided. The relay node includes a component configured such that, when the relay node receives data from a UA, and when the relay node has not received an ACK message from an access node indicating that the access node has received the data, the relay node sends the data to the access node.

In another embodiment, an alternative method is provided for providing UA data. The method includes an access node receiving an indicator sent from a relay node as an indication that the relay node has received data from the UA.

In another embodiment, an access node in a wireless telecommunications system is provided. The access node includes a component configured such that the access node receives from a relay node an indication that the relay node has received data from a UA.

In another embodiment, a relay node in a wireless telecommunications system is provided. The relay node includes a component configured such that the relay node transmits to an access node an indication that the relay node has received data from a UA.

The following are incorporated herein by reference for all purposes: 3rd Generation Partnership Project (3GPP) Technical Specification (TS) 36.814 and 3GPP TS 36.331.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented in a relay node for providing user agent (UA) data, the method comprising:
   receiving the UA data from a UA, wherein the relay node and the UA communicate over an access link;
   sending, without a prompt, the UA data to an access node until the relay node detects an acknowledgement (ACK) from the access node to the UA, wherein the relay node and the access node communicate over a relay link; and
   receiving, from the access node, a request for retransmission of the UA data after the relay node detects the ACK.

2. The method of claim 1, further comprising:
   not sending the UA data to the access node when the ACK message has been detected from the access node until the request for retransmission is received.

3. The method of claim 1, wherein, when the access node transmits a negative acknowledgement (NACK) message indicating that the access node has not received the data, the UA retransmits the data.

4. A relay node in a wireless telecommunications system, the relay node comprising:
   a memory; and
   a processor coupled to the memory and configured to:

receive user agent (UA) data from a UA, wherein the relay node and the UA communicate over an access link, send, without a prompt, the UA data to an access node until the relay node detects an acknowledgement (ACK) message from the access node to the UA, wherein the relay node and the access node communicate over a relay link, and receive, from the access node, a request for retransmission of the UA data after the relay node detects the ACK.

5. The relay node of claim 4 wherein, the processor is further configured to not send the UA data to the access node when the ACK message has been detected from the access node until the request for retransmission is received.

6. The relay node of claim 4, wherein, when the access node transmits a negative acknowledgement (NACK) message indicating that the access node has not received the data, the UA retransmits the data.

7. A method implemented in an access node for providing user agent (UA) data, the method comprising:

receiving an indicator sent from a relay node as an indication that the relay node has received data from a UA, wherein the access node and the relay node communicate over a relay link, and wherein the relay node and the UA communicate over an access link;

sending a first acknowledgement (ACK) message to the UA upon receiving the indicator regardless of whether the access node decoded the data successfully; and sending a second ACK message to the relay node upon subsequently receiving the data at the access node from the relay node.

8. The method of claim 7, wherein, when the access node does not receive the data from the UA, the access node instructs the relay node to transmit the data.

9. An access node in a wireless telecommunications system, the access node comprising:

a memory; and a processor coupled to the memory and configured to:

receive, from a relay node, an indication that the relay node has received data from a user agent (UA), wherein the access node and the relay node communicate over a relay link, and wherein the relay node and the UA communicate over an access link;

send, upon receiving the indication, a first acknowledgement (ACK) message to the UA regardless of whether the access node decoded the data successfully; and send a second ACK message to the relay node upon subsequently receiving the data from the relay node.

10. The access node of claim 9, wherein, when the access node receives the data from the UA, the access node instructs the relay node to discard the data.

11. The access node of claim 9, wherein, when the access node does not receive the data from the UA, the access node instructs the relay node to transmit the data.

12. A relay node in a wireless telecommunications system, the relay node comprising:

at least one component configured to:

transmit to an access node an indication that the relay node has received data from a user agent (UA), wherein the relay node and the access node communicate over a relay link, and wherein the relay node and the UA communicate over an access link, detect an acknowledgment (ACK) message sent from the access node to the UA, and discard the data based on the detecting.

13. The relay node of claim 12, wherein, upon receiving the indication, the access node sends the acknowledgement (ACK) message to the UA.

14. The relay node of claim 12, wherein the relay node transmits the data upon receiving additional instruction from the access node to transmit the data.

* * * * *